No. 691,028. Patented Jan. 14, 1902.
J. G. WEBB.
RUBBER TIRE EQUIPMENT FOR VEHICLE WHEELS.
(Application filed July 5, 1900.)
(No Model.)
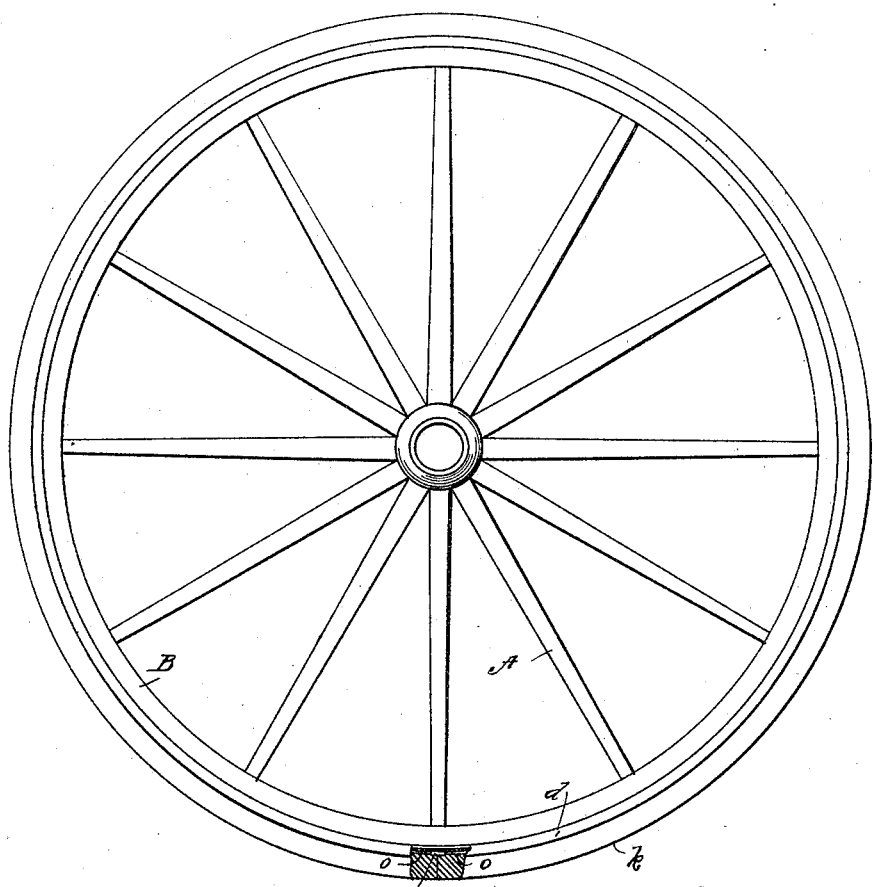
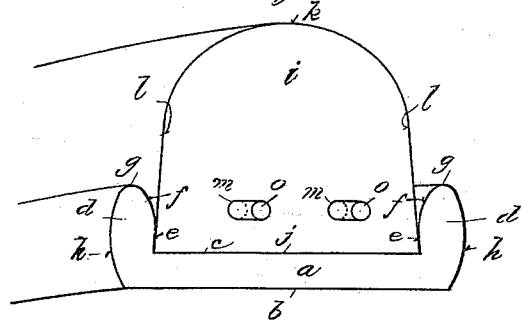

UNITED STATES PATENT OFFICE.

JOHN G. WEBB, OF SPRINGFIELD, OHIO, ASSIGNOR TO THE VICTOR RUBBER COMPANY, OF SPRINGFIELD, OHIO, A CORPORATION OF OHIO.

RUBBER-TIRE EQUIPMENT FOR VEHICLE-WHEELS.

SPECIFICATION forming part of Letters Patent No. 691,028, dated January 14, 1902.

Application filed July 5, 1900. Serial No. 22,487. (No model.)

*To all whom it may concern:*

Be it known that I, JOHN G. WEBB, a citizen of the United States, residing at Springfield, in the county of Clark and State of Ohio, have invented certain new and useful Improvements in Rubber-Tire Equipments for Vehicle-Wheels, of which the following is a specification, reference being had therein to the accompanying drawings.

This invention relates to certain new and useful improvements in rubber-tire equipments for vehicle-wheels.

The objects of the invention are to provide a rubber-tire equipment having these several features—namely, first, a channel-iron adapted to be formed into a continuous band or ring and applied to a wheel, having rigid flanges inclined inward on their inner sides a part of their depth, turned outward or rounded on their inner sides the remainder of their depth, rounded on their edges and bulged or convexed on their sides, the inner sides of said flanges being smooth and without ribs or projections, the inner or dovetail inclination being to receive and assist in holding the rubber, the said outwardly turned or rounded inner side being to provide a space into which the rubber can bulge laterally when under a load, the rounded edge to prevent cutting or chafing of the rubber and the bulged or convexed outer sides to form surfaces adapted to keep off and force to one side obstructions in the roadway, and, secondly, a rubber forming the tire proper, having straight but inclined sides farthest apart at the base of the rubber and constantly converging toward each other until joined by the curve of the tread portion, and one or more longitudinal openings entirely through the rubber, the said inclined sides being for the purpose of interlocking the rubber with the interior of the channel-iron when the rubber is undergoing lateral expansion due to vertical pressure, and also to cause said sides to stand away from the inner upper outwardly turned or rounded sides of the flanges, and the purpose of said one or more openings being to receive additional fastening devices composed of wires or bands which extend throughout the length of the rubber and are united at their ends.

In the accompanying drawings, forming a part of this specification, and on which like reference-letters indicate corresponding parts, Figure 1 represents a side elevation of a vehicle-wheel having applied thereto my improved rubber-tire equipment; and Fig. 2, a perspective view, on a larger scale, showing one end of the channel-iron, rubber, and wires before the parts are brought into relation with the other corresponding end.

The letter A designates a vehicle-wheel, of any approved or selected type, having the usual hub, spokes, and wooden rim, the latter being shown at B. On this rim is placed and secured in any convenient way the metallic channel-iron of my rubber-tire equipment. This channel-iron is in the form of bars cut to suitable lengths and bent to form a ring or band whose ends are united by welding in the usual way of welding iron or steel. This channel-iron so treated forms a metallic tire for the wheel and also a groove or channel for the reception of the rubber which forms the tire proper.

The peculiarities of that part of my invention or equipment which is composed of the channel-iron are best shown in Fig. 2, in which *a* is the base or body of the channel-iron, having a flat lower surface and a flat upper surface, as seen at *b* and *c*, respectively, the surface *b* fitting upon the periphery of the wheel-rim and the surface *c* receiving the base of the rubber tire proper. At each side is a flange *d*, whose inner surface part way up is formed on a straight inclined line *e*. These lines converge toward one another from the base-line *c* upward, and so form a tapering or dovetailed interior or seat within the channel-iron. The remainder of the inner sides of the flanges are formed in lines *f*, which turn or curve outward and join curved or semicircular lines *g*, defining the shape of the edges of the flanges. The exterior or outside of each flange is formed on a bulged or convex line *h*, joining the curved edged line *g* and intersecting the base-line *b*.

Referring now to the rubber tire proper, which is more clearly shown in Fig. 2, it is seen to consist of a body *i*, having a straight base *j*, which fits upon the base *c* of the channel-iron, a curved crown or tread $k$, which travels upon the road, and inclined sides $l$, which unite at one end with the curved extremities of the tread portion and at the other intersect with the base-line $j$, thus forming converging sides to the rubber, which draw inward from the base to the point of union with the tread. In this rubber I form one or more continuous openings or passages $m$ for the insertion of a corresponding number of wires or bands $o$, which are to pass through the rubber and are to be united at their ends, as suggested at $p$ in Fig. 1, the union being effected in any of the known ways, such as by electric welding or brazing or otherwise. It will be understood, of course, that these wires are put under a tension sufficient to secure the rubber firmly in the channel-iron or firmly therein in connection with the additional fastening features constituted of the interlocking action between the inclined sides $e$ of the flanges and the inclined sides $l$ of the rubber, which action takes place when the rubber is under a load, because the load tends to compress the rubber vertically, and thereby expand it laterally into severe interlocking connection with the channel-iron.

Having thus referred to the function of the retaining-wires $o$ and the inclined sides $e$ of the flanges and $l$ of the rubber, I will now refer also to the functions of the remaining-described peculiar characteristics of the channel-iron. The function of the outwardly turned or curved surfaces defined by the lines $f$, which surfaces compose the upper portion of the inner sides of the flanges is, in connection with the oppositely-inclining sides $l$ of the rubber, to provide or leave a space into which the rubber can crowd laterally when under loads, so that it will not spread over the flanges. Thus the innermost portion of the rubber is in interlocking connection with the flanges, while the remaining portion of the rubber within the periphery of the flanges has a lateral expansible relation thereto and while also the interior body of the rubber is bound forcibly against and within the channel by the strains or tension of the retaining-wires. The function of the curved edges $g$ of the flanges is to prevent chafing or cutting of such parts of the rubber as may become involved therewith, say, under excessive loads. The function of the curved or convexed outer surfaces $h$ of the flanges is to keep off or more or less divert away loose obstructions in the road which are high enough to be reached by the flanges and is also to protect the rubber against severe side abrasion with fixed objects like curbstones, the convexity of the sides $h$ adapting them to go up against curbstones and such objects without tending to climb upon the same, and thereby keeping the sides of the rubber safely away from such objects.

Thus in my improved tire equipment I have provided for the performance of all the functions necessary to a complete and practical tire capable of successful use mechanically and general introduction commercially.

Having thus fully described my invention, what I claim as new, and desire to secure by Letters Patent, is—

In a rubber-tire equipment, the combination, with a channel-iron having a flat base, the outer surface whereof forms a flat tire-seat, and rigid flanges extending upward from said base and tire-seat, the exterior surface of each flange curving first outward and upward, and then inward and upward, and the interior surface of each flange being smooth or without ribs or projections and curving first upward and inward, and then upward and outward, and joined to the exterior surface of said flange by a curve which forms a rounded edge for the flange, said flanges being thicker near their middle than either above or below said thickened portion, of a rubber tire proper having a flat base fitting upon the tire-seat in the channel-iron, and straight sides converging toward each other from said base, the base portion of said tire fitting within the dovetailed recess formed by the converging portions of the inner surfaces of the channel-iron flanges and the portion lying outward from said base portion diverging from the outwardly-curved portions of the inner surfaces of the flanges to form spaces about half the depth of the flanges to permit lateral bulging of the rubber under compression, said straight portions being joined by a curved tread, and retaining-wires within said rubber tire for holding said tire within said channel-iron and united at their ends.

In testimony whereof I affix my signature in presence of two witnesses.

JOHN G. WEBB.

Witnesses:
WM. O'LAUGHLIN,
F. W. SCHAEFER.